(12) United States Patent
Chen et al.

(10) Patent No.: US 11,398,062 B2
(45) Date of Patent: Jul. 26, 2022

(54) FACE SYNTHESIS (71) Applicant: Microsoft Technology Licensing, LLC, Redmond, WA (US)

(72) Inventors: Dong Chen, Beijing (CN); Fang Wen, Beijing (CN); Gang Hua, Sammamish, WA (US); Jianmin Bao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 16/957,363

(22) PCT Filed: Jan. 8, 2019

(86) PCT No.: PCT/US2019/012797
§ 371 (c)(1),
(2) Date: Jun. 23, 2020

(87) PCT Pub. No.: WO2019/147413
PCT Pub. Date: Aug. 1, 2019

(65) Prior Publication Data
US 2020/0334867 A1     Oct. 22, 2020

(30) Foreign Application Priority Data

Jan. 29, 2018   (CN) .......................... 201810082732.8

(51) Int. Cl.
*G06K 9/36*     (2006.01)
*G06T 3/00*     (2006.01)
(Continued)

(52) U.S. Cl.
CPC ............ *G06T 11/00* (2013.01); *G06K 9/6256* (2013.01); *G06V 40/168* (2022.01); *G06V 40/172* (2022.01)

(58) Field of Classification Search
CPC ...... G06K 9/00221–2009/00328; G06T 13/40; G06T 11/00; G06T 2207/20081;
(Continued)

(56) References Cited

U.S. PATENT DOCUMENTS 11,093,780 B2 *   8/2021   Yoo ...................... G06K 9/6255

OTHER PUBLICATIONS

Li et al., "Convolutional Network for Attribute-driven and Identity-preserving Human Face", arXiv:1608.06434v1 [cs.CV] Aug. 23, 2016, 9 pages. (Year: 2016).*
(Continued)

*Primary Examiner* — Brian Werner
(74) *Attorney, Agent, or Firm* — Schwegman Lundberg & Woessner, P.A.

(57) ABSTRACT

In accordance with implementations of the subject matter described herein, there is provided a solution for face synthesis. In this solution, a first image about a face of a first user and a second image about a face of a second user are obtained. A first feature characterizing an identity of the first user is extracted from the first image, and a second feature characterizing a plurality of attributes of the second image is extracted from the second image, where the plurality of attributes do not include the identity of the second user. Then, a third image about a face of the first user is generated based on the first and second features, the third image reflecting the identity of the first user and the plurality of attributes of the second image.

14 Claims, 5 Drawing Sheets

(51) Int. Cl.
   *G06T 11/00* (2006.01)
   *G06K 9/62* (2022.01)
   *G06V 40/16* (2022.01)
(58) Field of Classification Search
   CPC ............ G06T 2207/20084; G06N 3/02–3/105;
   G06N 20/00–20/20; G06V 40/168–40/171
   See application file for complete search history.

(56) References Cited

OTHER PUBLICATIONS

Li et al., "Deep Identity-aware Transferor Facial Attributes", arXiv:1610.05586v1 [cs.CV] Oct. 18, 2016, pp. 1-13. (Year: 2016).*
Antipov, et al., "Face aging with Conditional Generative Adversarial Networks", In Repository of arXiv:1702.01983v1, Feb. 7, 2017, 5 Pages.
Arjovsky, et al., "Towards Principled Methods for Training Generative Adversarial Networks", In Proceedings of 5th International Conference on Learning Representations, Apr. 24, 2017, 17 Pages.
Arjovsky, et al., "Wasserstein Gan", In Repository of arXiv:1701.07875v1, Jan. 26, 2017, 30 Pages.
Bao, et al., "CVAE-GAN: Fine-Grained Image Generation through Asymmetric Training", In Repository of arXiv:1703.10155v1, Mar. 29, 2017, 15 Pages.
Bao, et al., "Towards Open-Set Identity Preserving Face Synthesis", In Proceedings of the IEEE Conference on Computer Vision and Pattern Recognition, Jun. 18, 2018, pp. 6713-6722.
Berthelot, et al., "BEGAN: Boundary Equilibrium Generative Adversarial Networks", In Repository of arXiv:1703.10717v1, Mar. 31, 2017, 9 Pages.
Chen, et al., "InfoGAN: Interpretable Representation Learning by Information Maximizing Generative Adversarial Nets", In Proceedings of 30th Conference on Neural Information Processing Systems, Dec. 5, 2016, 9 Pages.
Chen, et al., "Joint Cascade Face Detection and Alignment", In Proceedings of 13th European Conference on Computer Vision, Sep. 6, 2014, pp. 109-122.
Dong, et al., "Semantic Image Synthesis via Adversarial Learning", In Repository of arXiv:1707.06873v1, Jul. 21, 2017, 9 Pages.
Dosovitskiy, et al., "Learning to Generate Chairs, Tables and Cars with Convolutional Networks", In Journal of IEEE Transactions on Pattern Analysis and Machine Intelligence, vol. 39, Issue 4, Apr. 2017, pp. 692-705.
Goodfellow, et al., "Generative Adversarial Nets", In Proceedings of Annual Conference on Neural Information Processing Systems, Dec. 8, 2014, 9 Pages.
Gross, et al., "Multi-Pie", NIH Public Access, Author Manuscript, published in final edited form as: Proc. Int. Conf. Autom. Face Gesture Recognit., vol. 28, Issue 5, May 1, 2010, 807-813. (2010), 21 Pages.
Guo, et al., "MS-Celeb-1M: A Dataset and Benchmark for Large-Scale Face Recognition", In Proceedings of 14th European Conference on Computer Vision, Oct. 11, 2016, 17 Pages.
Hassner, et al., "Effective Face Frontalization in Unconstrained Images", In Proceedings of Conference on Computer Vision and Pattern Recognition, Jun. 7, 2015, pp. 4295-4304.
Huang, et al., "Beyond Face Rotation: Global and Local Perception GAN for Photorealistic and Identity Preserving Frontal View Synthesis", In Repository of arXiv: 1704.04086v1, Apr. 13, 2017, 11 Pages.
Ioffe, et al., "Batch Normalization: Accelerating Deep Network Training by Reducing Internal Covariate Shift", In Repository of arXiv: 1502.03167v1, Feb. 11, 2015, 10 Pages.
Kingma, et al., "Auto-Encoding Variational Bayes", In Repository of arXiv: 1312.6114v1, Dec. 20, 2013, 9 Pages.

Kulkarni, et al., "Deep Convolutional Inverse Graphics Network", In Proceedings of Annual Conference on Neural Information Processing Systems 2015, Dec. 7, 2015, 9 Pages.
Larochelle, et al., "The Neural Autoregressive Distribution Estimator", In Proceedings of the Fourteenth International Conference on Artificial Intelligence and Statistics, Apr. 11, 2011, pp. 29-37.
Larsen, et al., "Autoencoding Beyond Pixels Using a Learned Similarity Metric", In Repository of arXiv:1512.09300v1, Dec. 31, 2015, 7 Pages.
Li, et al., "Convolutional Network for Attribute-driven and Identity-preserving Human Face Generation", In Repository of arXiv:1608.06434v1, Aug. 23, 2016, 9 Pages.
Liu, et al., "Unsupervised Image-to-lmage Translation Networks", In Repository of arXiv:1703.00848v1, Mar. 2, 2017, 19 Pages.
Metzen, et al., "On Detecting Adversarial Perturbations", In Repository of arXiv:1702.04267v1, Feb. 14, 2017, 12 Pages.
Learned-Miller, et al., "Labeled Faces in the Wild: A Survey", In Book of Advances in Face Detection and Facial Image Analysis, Apr. 2, 2016, pp. 1-55.
Mirza, et al., "Conditional Generative Adversarial Nets", In Repository of arXiv:1411.1784v1, Nov. 6, 2014, 7 Pages.
Ng, et al., "A Data-Driven Approach to Cleaning Large Face Datasets", In Proceedings of IEEE International Conference on Image Processing, Oct. 27, 2014, pp. 343-347.
"International Search Report & Written Opinion issued in PCT Application No. PCT/US2019/012797", dated Apr. 4, 2019, 10 Pages.
Radford, et al., "Unsupervised Representation Learning with Deep Convolutional Generative Adversarial Networks", In Repository of arXiv:1511.06434v1, Nov. 19, 2015, 15 Pages.
Rahim, et al., "Face Recognition using Local Binary Patterns (LBP)", Published in Global Journal of Computer Science and Technology, vol. 13, Issue 4, May 31, 2013, 9 Pages.
Reed, et al., "Deep Visual Analogy-Making", In Proceedings of Annual Conference on Neural Information Processing Systems, Dec. 7, 2015, 9 Pages.
Reed, et al., "Generative Adversarial Text to Image Synthesis", In Proceedings of the 33rd International Conference on Machine Learning, Jun. 19, 2016, 9 Pages.
Rezende, et al., "Stochastic Backpropagation and Approximate Inference in Deep Generative Models", In Repository of arXiv:1401.4082v1, Jan. 16, 2014, 15 Pages.
Salimans, et al., "Improved Techniques for Training GANs", In Repository of arXiv:1606.03498v1, Jun. 10, 2016, 10 Pages.
Simonyan, et al., "Very Deep Convolutional Networks for Large-Scale Image Recognition", In Repository of arXiv:1409.1556v1, Sep. 4, 2014, 10 Pages.
Tran, et al., "Disentangled Representation Learning GAN for Pose-Invariant Face Recognition", In Proceedings of IEEE Conference on Computer Vision and Pattern Recognition, Jul. 21, 2017, pp. 1283-1292.
Yan, et al., "Attribute2Image: Conditional Image Generation from Visual Attributes", In Repository of arXiv:1512.00570v1, Dec. 2, 2015, 11 Pages.
Yl, et al., "Learning Face Representation from Scratch", In Repository of arXiv:1411.7923v1, Nov. 28, 2014, 9 Pages.
Yin, et al., "Towards Large-Pose Face Frontalization in the Wild", In Proceedings of IEEE International Conference on Computer Vision, Oct. 22, 2017, pp. 4010-4019.
Yoo, et al., "Pixel-Level Domain Transfer", In Proceedings of 14th European Conference on Computer Vision, Oct. 11, 2016, 17 Pages.
Zhang, et al., "StackGAN: Text to Photo-realistic Image Synthesis with Stacked Generative Adversarial Networks", In Repository of 1612.03242v1, Dec. 10, 2016, 15 Pages.
Zhu, et al., "High-Fidelity Pose and Expression Normalization for Face Recognition in the Wild", In Proceedings of IEEE Conference on Computer Vision and Pattern Recognition, Jun. 7, 2015, pp. 787-796.

* cited by examiner

FACE SYNTHESIS

CROSS-REFERENCE TO RELATED APPLICATION

This application is a U.S. National Stage Filing under 35 U.S.C. 371 of International Patent Application Serial No. PCT/US2019/012797, filed Jan. 8, 2019, and published as WO 2019/147413 A1 on Aug. 1, 2019, which claims priority to Chinese Application No. 201810082732.8, filed Jan. 29, 2018, which applications and publication are incorporated herein by reference in their entirety.

BACKGROUND

Face synthesis is one of the most challenging topics in the field of computer vision and computer graphics. It can be widely used in many fields, such as human-computer interaction, movie advertising, computer games, teleconferencing, and auxiliary teaching.

Face synthesis is a technique of synthesizing respective attributes of multiple face images into an output face image. The "attributes" described herein include, but are not limited to, an identity of a person in the image, a facial pose, facial expression, illumination of the image, image background, and the like. In the face synthesis technology, identity-preserving face synthesis is a challenging technical problem. The "identity-preserving face synthesis" described herein means that, when a first face image and a second face image are synthesized into an output face image, an identity of a person in the first face image is preserved but other attributes than an identity of a person in the second face image are reflected in the output face image.

Face synthesis usually relies on a face synthesis model which has been trained with a set of face images. Some conventional schemes try to implement the identity-preserving face synthesis as described above but have many limitations in model training. Therefore, it is expected to achieve more general identity-preserving face synthesis.

SUMMARY

In accordance with implementations of the subject matter described herein, there is provided a solution for face synthesis. In this solution, a first image about a face of a first user and a second image about a face of a second user are obtained. A first feature characterizing an identity of the first user is extracted from the first image, and a second feature characterizing a plurality of attributes of the second image is extracted from the second image, where the plurality of attributes do not include the identity of the second user. Then, a third image about a face of the first user is generated based on the first and second features, the third image reflecting the identity of the first user and the plurality of attributes of the second image. The solution for face synthesis according to the subject matter described herein enables identity-preserving image synthesis for a face image of any identity regardless of whether the face image of a person having the identity is present in the training data set or not. Besides, while training a model for face synthesis as described above, the solution does not require labeling any other attributes than the identity of a person.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION OF EMBODIMENTS

The subject matter described herein will now be discussed with reference to several example implementations. It is to be understood that these implementations are discussed only for the purpose of enabling those skilled persons in the art to better understand and thus implement the subject matter described herein, rather than suggesting any limitation to the scope of the subject matter described herein.

As used herein, the term "includes" and its variants are to be read as open-ended terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be further included below.

Example Environment

Figure 1:
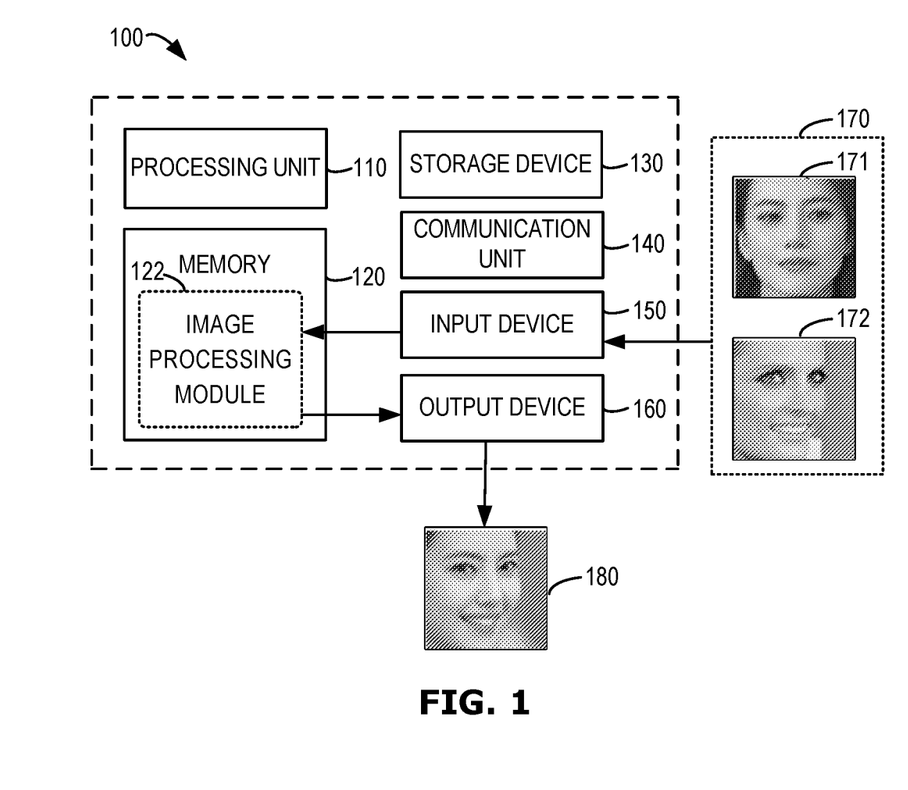
FIG. 1 illustrates a block diagram of a computing device in which implementations of the subject matter described herein can be implemented.

Basic principles and several example implementations of the subject matter described herein will be described below with reference to the drawings. FIG. 1 illustrates a block diagram of a computing device 100 in which implementations of the subject matter described herein can be implemented. It is to be understood that the computing device 100 described in FIG. 1 is merely exemplary, without suggesting any limitations to the function and scope of implementations of the subject matter described herein in any manners. As shown in FIG. 1, the computing device 100 includes a computing device 100 in the form of a general-purpose computing device. The components of the computing device 100 may include, but are not limited to, one or more processors or processing units 110, a memory 120, and a storage device 130, one or more communication units 140, one or more input devices 150 and one or more output devices 160.

In some implementations, the computing device 100 may be implemented as various user terminals or service terminals with computing capabilities. The service terminals may be servers, large-scale computing devices and the like provided by various service providers. The user terminals are, for instance, any type of mobile terminal, fixed terminal, or portable terminal, including mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/video players, positioning devices, television receivers, radio broadcast receivers, electronic book devices, gaming devices or any combination thereof, including the accessories and peripherals of these devices, or any combination thereof. It may be further predicted that the computing device 100 can support any type of interface for the user (such as "wearable" circuitry, etc.).

The processing unit 110 may be a physical or virtual processor and can execute various processes based on the programs stored in the memory 120. In a multi-processor system, multiple processing units execute computer-executable instructions in parallel to improve the parallel processing capacity of the computing device 100. The processing unit 110 is also referred to as central processing unit (CPU), microprocessor, controller and microcontroller.

The computing device 100 typically includes a plurality of computer storage media, which can be any available media accessible by the computing device 100, including but not limited to volatile and non-volatile media, and removable and non-removable media. The memory 120 can be a volatile memory (for example, a register, high-speed cache, random access memory (RAM)), non-volatile memory (for example, a read-only memory (ROM), electrically erasable programmable read-only memory (EE-PROM), flash memory), or any combination thereof. The memory 120 may include an image processing module 122. These program modules are configured to perform the functions of various implementations described herein. The image processing module 122 may be accessed and operated by the processing unit 110 to implement the corresponding functions The storage device 130 may be removable and non-removable media and may include machine readable media capable of storing information and/or data and accessible in the computing device 100. The computing device 100 may further include other removable/non-removable and volatile/non-volatile storage media. Although not shown in FIG. 1, it is possible to provide disk drive for reading from and writing into removable and non-volatile disks and disc drive for reading from and writing into removable and non-volatile discs. In such cases, each drive can be connected to the bus (not shown) via one or more data medium interfaces.

The communication unit 140 communicates with a further computing device via communication media. Additionally, functions of components of the computing device 100 may be implemented by a single computing cluster or multiple computing machines that are communicatively connectable for communication. Therefore, the computing device 100 may be operated in a networking environment using a logical link with one or more other servers, personal computers (PCs) or another general network node.

The input device 150 may include one or more input devices, such as a mouse, keyboard, touch screen, tracking ball, voice-input device and the like. The output device 160 may be one or more output devices, such as a display, loudspeaker, printer and the like. The computing device 1X) may also communicate with one or more external devices (not shown) via the communication unit 140 as required. The external devices, such as storage devices and display devices and so on, communicate with one or more devices that enable the user to interact with the computing device 100, or any device (such as a network card, modem, and the like) that enables the computing device 100 to communicate with one or more other computing devices. Such communication is performed via an input/output (I/O) interface (not shown).

The computing device 100 may be used to implement face synthesis in multiple implementations of the subject matter described herein. Therefore, in the following, the computing device 100 is sometimes also referred to as "image processing device 100." Before face synthesis is implemented, a model for face synthesis may be trained with a set of face images. The training of the model may be implemented by the image processing device 100 or other computing devices and inputted to the image processing device 100 via the input device 150. While performing face synthesis, the image processing device 100 may receive, via the input device 150, a first image 171 about the first user's face and a second image 172 about the second user's face (collectively referred to as "input images 170"). Then, the image processing device 100 may use the trained face synthesis model to generate a third image 180 (also referred to as "synthesized image 180" or "output image 180") about the first user based on the first image 171 and the second image 172, where the third image 180 preserves the identity of the first user in the first image 171 but reflects a plurality of attributes of the second image 172 other than the identity of the second user. The "attributes" of the image described herein include, but are not limited to, the identity of the person in the image, a facial pose, facial expression, illumination of the image, image background, and the like. The image processing device may further output the third face image 180 via the output device 160.

Some conventional schemes also try to implement the above identity-preserving face synthesis but have many limitations in model training.

For example, the traditional schemes usually require the training data for training the face synthesis model to include a face image of the person whose identity is to be preserved. That is, for a face image of a person who is not involved in the training data, the conventional scheme cannot preserve the identity of the person when face synthesis is performed.

Moreover, the conventional schemes usually further require that each attribute to be reflected in the output face image should be labeled specifically in training data. That is, unlabeled attributes will not be reflected in the output face image. However, in practice, it is often very difficult to label the attributes in an image because one image may possibly have numerous attributes. It is obviously not practical to label each of the attributes in each of a large number of training images. Besides, some attributes of the image may not be labeled, such as the illumination and background of the image. As it is impossible to label all of the attributes of the image in the training data, the class and number of attributes that the synthesized face image can reflect in the conventional schemes are often very limited.

Some problems existing in the current face synthesis schemes have been discussed as above. In accordance with implementations of the subject matter described herein, there is provided a scheme for face synthesis to solve one or more of the above and other potential problems. This scheme enables identity-preserving image synthesis for a face image of any identity regardless of whether the face image of a person having the identity is present in the training data set or not. Besides, while training a model for face synthesis as described above, the solution does not require labeling any other attributes than the identity of a person. In addition, this scheme can further improve the diversity of synthesized images by using unlabeled additional training images for model training, such that the generated face images present larger changes in poses and expressions, thus being more vivid.

Various example implementations of the scheme will be described below in detail with reference to the drawings.

System Architecture

Figure 2:
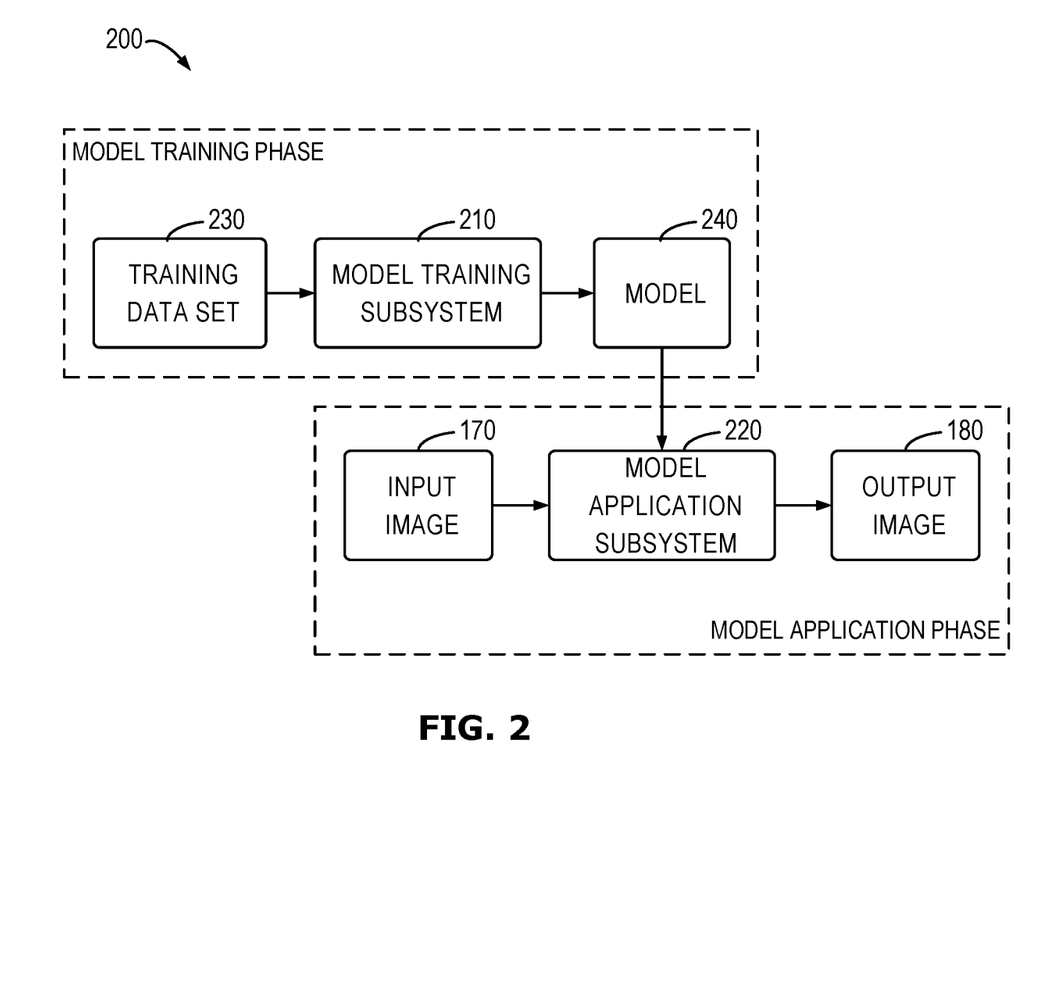
FIG. 2 illustrates a block diagram of a system for face synthesis in accordance with some implementations of the subject matter described herein.

FIG. 2 illustrates a block diagram of a system 200 for face synthesis in accordance with some implementations of the subject matter described herein. As illustrated in FIG. 2, the system 200 generally may include a model training subsystem 210 and a model application subsystem 220. For instance, the model training subsystem 210, the model application subsystem 220, or both may be implemented by the computing device 100 illustrated in FIG. 1. It is to be understood that the structure and function of the system 200 are described for purpose of illustration, without suggesting any limitations to the scope of the subject matter described herein. The subject matter described herein may be embodied in different structures and/or functions.

Generally, the scheme for identity-preserving face synthesis in accordance with implementations of the subject matter described herein may be divided into two phases: a model training phase and a model application phase. In the model training phase, the model training subsystem 210 may receive a training data set 230 and train a model 240 for face synthesis based on the training data set 230. In the model application phase, the model application subsystem 220 may receive the trained model 240 and input images 170. The model application subsystem 220 may generate a synthesized image 180 with the received model 240 based on the input images 170.

In some implementations, the training data set 230 may include a set of face images each of which may be labeled with a respective identity of a person that the face image reflects. For example, the training data set 230 may be from common public face databases, such as FaceScrub, CASIA-WebFace, MS-Celeb-IM and so on.

In some implementations, the model 240 may be constructed as a learning network for face synthesis. Such a learning network may also be referred to as neural network, learning model, or be abbreviated as network or model. In some implementations, the learning network for face synthesis may include a plurality of sub-networks, each of which may be a multi-layered neural network being composed of a large amount of neurons. Through the training process, respective parameters of the neurons in each of the sub-networks can be determined. The parameters of neurons in these sub-networks are collectively referred to as parameters of the model 240.

The training process of the model 240 may be executed iteratively. In particular, the model training subsystem 210 may obtain at least one face image from the training data set 230 and use the at least one face image to perform one iteration of the training process, thereby updating respective parameters of the model 240. The model training subsystem 210 may repeat the above process based on a plurality of face images in the training data set 230 until at least a part of the parameters in the model 240 are converged, thereby obtaining the final model parameters.

The above model training process will be described in further detail in conjunction with an example structure of a learning network in accordance with implementations of the subject matter described herein.

Structure of Learning Network

Figure 3:
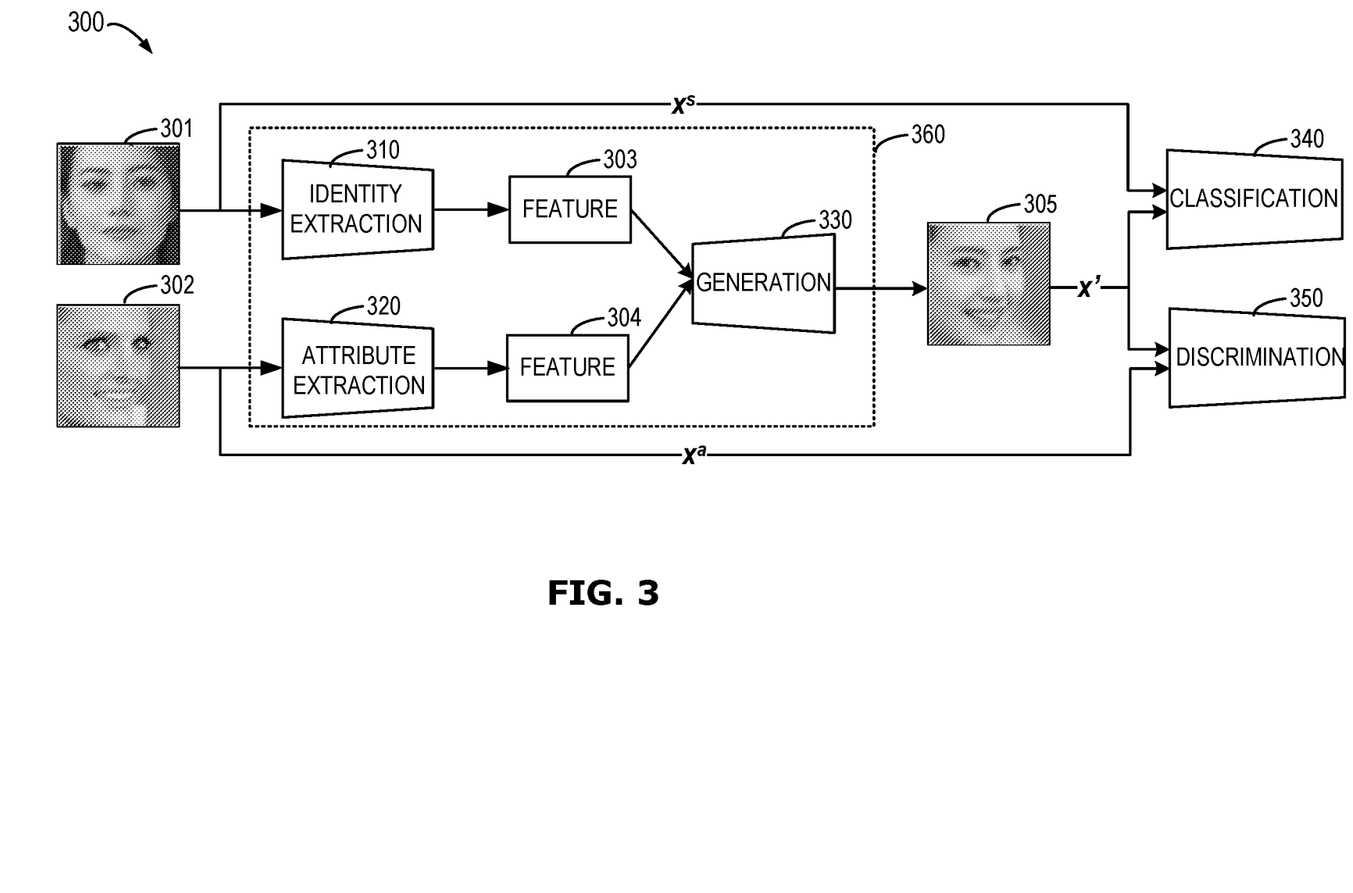
FIG. 3 illustrates an example learning network for face synthesis in accordance with implementations of the subject matter described herein.

FIG. 3 illustrates an example learning network 300 for face synthesis in accordance with implementations of the subject matter described herein. The learning network 300 may be considered as an example implementation of the model 240 illustrated in FIG. 2. It is to be understood that the structure and function of the learning network 300 illustrated in FIG. 3 are only for the purpose of illustration, without suggesting any limitations to the scope of the subject matter described herein. Besides, it is to be further understood that various types of neural networks can be used to construct the learning network 300 shown in FIG. 3 and sub-networks thereof, including but not limited to a convolutional neural network (CNN) and so on. For general considerations, the learning network 300 and types of its subsystems are not specified in the following depiction, while only the functions and training manners are described.

As illustrated in FIG. 3, in some implementations, the learning network 300 may include an identity extracting sub-network 310, an attribute extracting sub-network 320, a generating sub-network 330, a classifying sub-network 340 and a discriminating sub-network 350. In the depiction of the subject matter described herein, the identity extracting sub-network 310 is also referred to as "first sub-network," the attribute extracting sub-network 320 is also referred to as "second sub-network," the generating sub-network 330 is also referred to as "third sub-network," the classifying sub-network 340 is also referred to as "fourth sub-network," and the discriminating sub-network 350 is also referred to as "fifth sub-network."

In some implementations, the first sub-network 310 may be trained to extract, from a first face image 301, a first feature 303 which may characterize an identity of a person in the first face image 301. Assuming that a symbol $x^s$ is used to represent the first face image 301, and a symbol I is used to represent the first sub-network 310, and an identity vector $f_I(x^s)$ is used to represent the first feature 303, then $f_I(x^s)=I(x^s)$. In some implementations, the identity vector $f_I(x^s)$ may be extracted from at least one layer of the first sub-network 310. For example, in some implementations, the response of the last pooling layer of the first sub-network 310 may be used as the extracted identity vector $f_I(x^s)$.

In some implementations, the second sub-network 320 may be trained to extract, from a second face image 302, a second feature 304 which may characterize a plurality of attributes of the second face image 302 other than an identity of a person in the second face image 302. Assuming that a symbol $x^a$ is used to represent the second face image 302, a symbol A is used to represent the second sub-network 320, and an attribute vector $f_A(x^a)$ is used to represent the second feature 304, then $f_A(x^a)=A(x^a)$.

As illustrated in FIG. 3, outputs of the first sub-network 310 and the second sub-network 320 may be coupled to an input of the third sub-network 330. In some implementations, the third sub-network 330 may be trained to generate a synthesized image 305 (also referred to as "output image" in the following) based on the first feature 303 and the second feature 304. Assuming that a symbol x' is used to represent the synthesized image 305 and a symbol G is used to represent the third sub-network 330, then $x'=G([f_I(x^s)^T, f_A(x^a)^T]^T)$.

In some implementations, the classifying sub-network 340 and the discriminating sub-network 350 may be used only in the model training phase and not in the model application phase. That is, in the learning network 300, the network 360 which only includes the first sub-network 310, the second sub-network 320 and the third sub-network 330 may be used in the model application phase while the classifying sub-network 340 and the discriminating sub-network 350 may be only used to assist the training of the generating sub-network 330.

As illustrated in FIG. 3, an input of the first sub-network 310 and an output of the third sub-network 330 may be coupled to an input of the fourth sub-network 340. In some implementations, the fourth sub-network 340 may be trained to identify the first face image 301 and the synthesized image 305 as about a same user. As will be further described below, the fourth sub-network 340 may affect a loss function for training the third sub-network 330. In this manner, by means of training the fourth sub-network 340, the synthesized image 305 generated by the third sub-network can preserve the identity of the person in the first face image 301.

As illustrated in FIG. 3, an input of the second sub-network 320 and an output of the third sub-network 330 may be coupled to an input of the fifth sub-network 350. In some implementations, the fifth sub-network 350 may be trained to discriminate whether its input is an original image or a synthesized image. As will be further described below, the fifth sub-network 350 may affect the loss function for training the third sub-network 330. In this manner, by means of training the fifth sub-network 350, the synthesized image 305 generated by the third sub-network can reflect the plurality of attributes other than the identity of the person in the second face image 302 as many as possible.

The basic structure and functions of the example learning network 300 are described above with reference to FIG. 3, and the training details of each of the sub-networks in the learning network 300 will be described below in further detail.

Training of Learning Network

As stated above, in some implementations, the training process of the learning network 300 may be implemented iteratively. In particular, the model training sub-system 210 may obtain a pair of face images $\{x^s, x^a\}$ from the training data set 230, where the image $x^s$ is input to the first sub-network 310 (also referred to as "subject image" in the following) for identity identification, and the image $x^a$ is input to the second sub-network 320 (also referred to as "attribute image" in the following) for attribute identification. The subject image $x^s$ and the attribute image $x^a$ may be the same or different. In some implementations, the model training subsystem 210 may perform one iteration of the training process with this pair of face images to update respective parameters of the sub-networks in the learning network 300. Additionally, the model training subsystem 210 may repeat the above process based on the face images in the training data set 230 until parameters of at least a part (such as, the generating sub-network 330) of the sub-networks in the learning network 300 are converged, thereby obtaining the final model parameters.

Training of First Sub-network

Assuming that the model training subsystem 210 uses a set of training images from the training data set 230 to train the first sub-network 310, this set of training images, for instance, may be represented as $\{x_i^s, c_i\}$, where $c_i$ represents the identity of the labeled face image $x_i^s$. In some implementations, a softmax loss function may be used to train the first sub-network 310 to implement the task of face classification. Therefore, identity vectors of the same individual should be substantially the same. For example, the loss function for training the first sub-network 310 may be represented as:

$$\mathcal{L}_1 = -\mathbb{E}_{x \sim P_r}[\log P(c|x^s)] \quad \text{Equation (1)}$$

where $P(c|x^s)$ represents the probability of the face image $x^s$ having the identity c. The loss function $\mathcal{L}_1$ may represent the expectancy for $\log P(c|x^s)$ when the face image $x^s$ conforms to the assumed data distribution $P_r$.

In some implementations, the model training sub-system 210 may update network parameters of the first sub-network 310 by applying the gradient descent method to the loss function $\mathcal{L}_1$ as shown in equation (1).

Training of Second Sub-Network

In some implementations, in order to train the second sub-network 320 in an unsupervised manner, two loss functions may be used to train the second sub-network 320. These two loss functions may include a reconstruction loss function and a KL divergence loss function.

In order to build the reconstruction loss function, two conditions should be taken into consideration: 1) the subject image $x^s$ and the attribute image $x^a$ are the same; and 2) the subject image $x^s$ and the attribute image $x^a$ are different. Under both of these two conditions, it is expected that the synthesized image x' output by the third sub-network 330 can rebuild the attribute image $x^a$. That is, it is expected that the synthesized image x' can reflect all of the attributes of the attribute image $x^a$ other than the identity of the person. Therefore, the reconstruction loss function generally can measure the difference between the synthesized image x' and the attribute image $x^a$ (which is represented by an Euclidean distance between these two). However, under the above two conditions, the reconstruction loss function should have different weights.

In some implementations, with the above factors taken into account, the reconstruction loss function for training the second sub-network 320 may be represented as:

$$\mathcal{L}_{GR} = \begin{cases} \frac{1}{2}\|x^a - x'\|_2^2 & \text{if } x^s = x^a \\ \frac{\lambda}{2}\|x^a - x'\|_2^2 & \text{otherwise} \end{cases} \quad \text{Equation (2)}$$

where $\lambda$ represents the weight for the reconstruction loss function if the subject image $x^s$ and the attribute image $x^a$ are different. These two conditions will be further analyzed below.

When the subject image $x^s$ and the attribute image $x^a$ are the same, the output image x' is required to be the same as the image $x^s$ or $x^a$. For example, assuming that there exist various face images of a same identity, then their identity vectors $f_I(x^s)$ should be the same. However, the attribute vectors $f_A(x^a)$ of these face images may be different. Therefore, the reconstruction loss function should force the second sub-network 320 to learn different attribute representations $f_A(x^a)$ for these face images. When the subject image $x^s$ and the attribute image $x^a$ are different, the specific condition of the output image x' may be unknown. However, it can be expected that the synthesized image x' can reflect as many attributes of the attribute image $x^a$ as possible other than the identity of the person in the attribute image $x^a$, such as background, illumination and posture.

Therefore, in some implementations, for the case that the subject image $x^s$ and the attribute image $x^a$ are different, a smaller weight may be used to weight the reconstruction loss function. In some implementations, for instance, the weight $\lambda$, may have a value of 0.1.

In order to help the second sub-network 320 to obtain a better attribute vector, in some implementations, in addition to the above reconstruction loss function, a KL divergence loss function may be used to train the second sub-network 320 to regularize the attribute vector with an appropriate prior distribution. For example, an appropriate prior distribution P(z)~N(0,1) (where N(0,1) represents a standard normal distribution) may be used to limit the distribution range of the attribute vector, such that the attribute vector does not contain much identity information, if at all. In some implementations, the KL divergence loss function may be used to reduce the difference between the prior distribution P(z) and the learned distribution of the attribute vector. For example, the KL divergence loss function may be represented as:

$$\mathcal{L}_{KL} = KL(f_A(x^a) \| P(z)) \quad \text{Equation (3)}$$

$\mathcal{L}_{KL}$ may describe the difference between the distribution of the attribute vector and the used prior distribution P(z).

In some implementations, when the distribution of the attribute vector obeys Gaussian distribution, Equation (3) may be further rewritten as:

$$\mathcal{L}_{KL} = \frac{1}{2}\left(\mu^T \mu + \sum_{j=1}^{J}(\exp(\epsilon) - \epsilon - 1)\right) \quad \text{Equation (4)}$$

where J represents the number of elements of vector $\in$, j represents the $j^{th}$ element of vector $\in$, vector $\in$ represents the covariance of Gaussian distribution, and vector $\mu$ represents the average of Gaussian distribution. In some implementations, in the training phase of the second sub-network 320, $z=\mu+r\odot\exp(\epsilon)$ may be used to sample the attribute vectors, where r~N(0,I) represents a random vector in compliance with standard normal distribution (where I represents unit matrix) and $\odot$ represents the element-wise multiplication.

In some implementations, the mode training sub-system 210 may combine the reconstruction loss function $\mathcal{L}_{GR}$ as shown in Equation (2) and the KL divergence loss function $\mathcal{L}_{KL}$ as shown in Equation (3) or (4) to determine the loss function for training the second sub-network 320. The model training sub-network 210 may further apply the gradient descent method to the loss function to update network parameters of the second sub-network 320.

Training of Third, Fourth and Fifth Sub-Networks

In some implementations, after the identity vector $f_I(x^s)$ and the attribute vector $f_A(x^a)$ are extracted, a combined vector may be generated from both of them and fed to the third sub-network 330 for synthesizing a new face image. For example, the combined vector may be represented as: $z=[f_I(x^s)^T, f_A(x^a)^T]^T$. In some implementations, an asymmetric method described below may be used to train the third sub-network 330 such that the third sub-network 330 can generate an identity-preserving and vivid face image. Besides, this method makes the training process of the third sub-network 330 more stable.

In some implementations, the third sub-network 330 and the fifth sub-network 350 (namely, discriminating sub-network) may compete with each other. Specifically, the target of the fifth sub-network 350 is to discriminate the original image and the synthesized image while the target of the third sub-network 330 is to try to fool the fifth sub-network 350. Assuming that a symbol G is used to represent the third sub-network 330 and a symbol D is used to represent the fifth sub-network 350, the target of the fifth sub-network is to minimize the following loss function to distinguish the original image and the synthesized image:

$$\mathcal{L}_D = -\mathbb{E}_{x\sim P_r}[\log D(x^a)] - \mathbb{E}_{z\sim P_z}[\log(1-D(G(z)))] \quad \text{Equation (5)}$$

However, if the third sub-network 330 directly attempts to maximize the above loss function $\mathcal{L}_D$, the training process of the third sub-network 330 will be unstable (for instance, unable to converge). This is because, in practice, the distributions of the original image and the synthesized image may not overlap with each other, particularly at the early stage of the training process of the Learning network 300. Hence, to make the training process of the third sub-network 330 stable, the fifth sub-network 350 may be used to distinguish these two.

In some implementations, by minimizing the above loss function $\mathcal{L}_D$, the fifth sub-network 350 may be trained to be capable of distinguishing the original image $x^a$ and the synthesized image x' all the time. That is, $D(x^a) \to 1$ and $D(x') \to 0$. In this case, when using the gradient descent method to update network parameters of the third sub-network 330, $\partial \mathcal{L}_D / \partial G$ will be approximate to zero, thereby causing the gradient vanishing problem.

To address the above gradient vanishing problem, in some implementations, a pairwise feature matching loss function may be used to train the third sub-network 330. Specifically, to generate realistic face image quality, the features of the original image $x^a$ and the synthesized image x' should be matched. In some implementations, assuming that $f_D(x)$ represents the feature of the image x extracted from at least one layer of the fifth sub-network 350, the pairwise feature matching loss function may be constructed to measure the difference between the feature extracted based on the synthesized image x' and the feature extracted based on the original image $x^a$. For example, the pairwise feature matching loss function may be used to represent the Euclidean distance between the feature extracted from the synthesized image x' and the feature extracted from the original image $x^a$, namely, $$\mathcal{L}_{GD} = \frac{1}{2}\|f_D(x') - f_D(x^a)\|_2^2 \quad \text{Equation (6)}$$

In some implementations, the input of the last Fully Connected (FC) layer of fifth sub-network 350 may be extracted as the feature $f_D(x)$. Additionally or alternatively, in some other implementations, the feature $f_D(x)$ may be extracted from a plurality of layers of the fifth sub-network 350.

Meanwhile, the fourth sub-network 340 attempts to classify face images of different identities. That is, similar to the loss function of the first sub-network 310, the fourth sub-network 340 attempts to minimize the following loss function.

$$\mathcal{L}_C = -\mathbb{E}_{x\sim P_r}[\log P(c|x^s)] \quad \text{Equation (7)}$$

In some implementations, to generate identity-preserving face images, a feature reconstruction loss function may be used to train the third sub-network 330 so as to encourage the synthesized image x' and the image $x^s$ to have similar feature representations in the fourth sub-network 340 (namely, causing the fourth sub-network 340 to identify the image x' and the image $x^s$ as about a same user). In some implementations, assuming that $f_C(x)$ represents the feature of the image x extracted from at least one layer of the fourth sub-network 340, the feature reconstruction loss function may be constructed to measure the difference between the feature extracted from the synthesized image x' and the feature extracted from the original image x'. In particular, the feature reconstruction loss function, for instance, may represent the Euclidean distance between the feature extracted from the synthesized image x' and the feature extracted from the original image $x^s$, namely, $$\mathcal{L}_{GC} = \frac{1}{2}\|f_C(x') - f_C(x^s)\|_2^2 \quad \text{Equation (8)}$$

In some implementations, for simplicity, the input of the last FC layer of the fourth sub-network 340 may be extracted as the feature $f_C(x)$. Alternatively, in some other implementations, features from a plurality of layers of the fourth sub-network 340 may be combined as the feature $f_C(x)$, thereby improving the capability of the third sub-network 330 to preserve the identity of the person in the image $x^s$.

Additionally or alternatively, in some implementations, the fourth sub-network 340 and the first sub-network 310 may share network parameters. For example, a pre-trained human classification network may be used to initialize the fourth sub-network 340 and the first sub-network 310 to accelerate the training of the learning network 300. That is, in some implementations, the first sub-network 310 and the fourth sub-network 340 may be trained beforehand prior to other sub-networks.

In some implementations, the model training subsystem 210 may determine the loss function for training the third sub-network 330 by combining the reconstruction loss function $\mathcal{L}_{GR}$ as shown in Equation (2), the pairwise feature matching loss function $\mathcal{L}_{GD}$ as shown in Equation (6) and the feature reconstruction loss function $\mathcal{L}_{GC}$ as shown in Equation (8). The model training subsystem 210 may further apply the gradient descent method to the loss function to update network parameters of the third sub-network 330.

Example Training Algorithm

Training of the sub-networks of the example learning network 300 shown in FIG. 3 has been discussed as above. It can be seen that although there exist a plurality of loss functions shown in Table 1, each sub-network only involves a portion of the plurality of loss functions. Hence, the example learning network 300 shown in FIG. 3 is easy to be trained.

TABLE 1

Loss function of each of the sub-networks of the example learning network 300

| | Sub-network | | | | |
|---|---|---|---|---|---|
| | First sub-network | Second sub-network | Third sub-network | Fourth sub-network | Fifth sub-network |
| Loss function | $\mathcal{L}_I$ | $\mathcal{L}_{KL}, \mathcal{L}_{GR}$ | $\mathcal{L}_{GR}, \mathcal{L}_{GC}, \mathcal{L}_{GD}$ | $\mathcal{L}_C$ | $\mathcal{L}_D$ |

Table 2 shows an example algorithm for training the learning network 300 illustrated in FIG. 3 in accordance with implementations of the subject matter described herein. In the following example algorithm, in the training phase of the learning network 300, each iteration is divided into two steps: one step in case that $x^s = x^a$ and the other step in case that $x^s \neq x^a$. It is to be understood that the following algorithm is only illustrative, without suggesting any limitations to the scope of the subject matter described herein. The implementation of the subject matter described herein may also be represented in other manners.

TABLE 2

Example algorithm for training the learning network 300

Input: training data set 230;
    Initial network parameters $\theta_I$, $\theta_A$, $\theta_G$, $\theta_D$ and $\theta_C$ for the
first  sub-network I, second sub-network A, third sub-network
G, fifth sub-network D and fourth sub-network C
variable: iter←1; weight λ←1.
while $\theta_G$ does not converge do
  obtain training images {$x^s$, c} from the training data set 230; // c
represents an identity of the image $x^s$
  if iter%2 =1 then
    λ←1;    //if $x^s$ is the same as $x^a$, weight λ is1
    $x^a$←$x^s$;    // $x^s$ is the same as $x^a$
  else
    obtain training images {$x^a$, c} from the training data set 230;
    λ←0.1;    // if $x^s$ is different from $x^a$, weight λ is 0.1
  end if
  $\mathcal{L}_I \leftarrow -\mathbb{E}_{x \sim P_s}[\log P(c|x^s)]$; // constructing the loss function $\mathcal{L}_I$ for
  the first sub-network I
  $\mathcal{L}_C \leftarrow -\mathbb{E}_{x \sim P_r}[\log P(c|x^s)]$; // constructing the loss function $\mathcal{L}_C$ for
  the fourth sub-network C
  $f_I(x^s) \leftarrow I(x^s)$; $f_A(x^a) \leftarrow A(x^a)$; // extracting the identity vector and
  attribute vector
  $\mathcal{L}_{KL} \leftarrow KL(f_A(x^a) \| P(z))$; // constructing the KL divergence loss
  function $\mathcal{L}_{KL}$
  x' ← G([$f_I(x^s)^T$, $f_A(x^a)^T]^T$);// generating the image x'
  $\mathcal{L}_D \leftarrow -(\log(D(x^a)) + \log(1 - D(x')))$; // constructing the loss
  function $\mathcal{L}_D$ for the fifth sub-network D
  $\mathcal{L}_{GR} \leftarrow \frac{1}{2} \|x^a - x'\|_2^2$; // constructing the reconstruction loss
  function $\mathcal{L}_{GR}$
  $\mathcal{L}_{GD} \leftarrow \frac{1}{2} \|f_D(x^a) - f_D(x')\|_2^2$; // constructing the pairwise feature
  matching loss function $\mathcal{L}_{GD}$
  $\mathcal{L}_{GC} \leftarrow \frac{1}{2} \|f_C(x^s) - f_C(x')\|_2^2$; // constructing the pairwise
  feature matching loss function $\mathcal{L}_{GC}$
  $\theta_I \leftarrow -\nabla_{\theta_I}(\mathcal{L}_I)$; // updating network parameters of the first sub-
  network I
  $\theta_C \leftarrow -\nabla_{\theta_C}(\mathcal{L}_C)$; // updating network parameters of the fourth
  sub-network C
  $\theta_D \leftarrow -\nabla_{\theta_D}(\mathcal{L}_D)$; // updating network parameters of the fifth sub-
  network D
  $\theta_G \leftarrow -\nabla_{\theta_G}(\lambda \mathcal{L}_{GR} + \mathcal{L}_{GD} + \mathcal{L}_{GC})$; // updating network
  parameters of the third sub-network G
  $\theta_A \leftarrow -\nabla_{\theta_A}(\lambda \mathcal{L}_{KL} + \lambda \mathcal{L}_{GR})$; // updating network parameters of the
  second sub-network A
  iter ← iter + 1;
end while

Further Training of Learning Network

As stated above, the scheme according to the implementations of the subject matter described herein can perform identity-preserving image synthesis on image faces with any identity regardless of whether the face image of the person having this identity is present in the set of training data, which requires that the trained learning network can be adapted to various different extreme attributes, such as an extreme posture or illumination. However, the existing labeled common face databases are generally limited in size, leaving their attributes not diverse enough.

To solve this problem, in some implementations, an additional training data set having much larger variation may be utilized to further train the learning network shown in FIG. 3. For example, a large amount of face images may be collected from various sources and these face images without any labeling may be, thus more diverse than face images in any existing face database. For instance, these data may be added to the training data set 230 for training the learning network 300, and perform an unsupervised training process to train the learning network 300, thereby better synthesizing face images that do not appear in the training set.

These unlabeled images may be used as subject image $x^s$ or the attribute image $x^s$. When they are used as the attribute image $x^a$, the whole training process remains unchanged.

When they are used as the subject image $x^s$, since they are not labeled, the loss functions $\mathcal{L}_I$ and $\mathcal{L}_C$ may be neglected. In other words, the first sub-network I and the fourth sub-network C may be fixed and their network parameters will not be updated during the additional training process. That is, only network parameters of other sub-networks in the learning network 300 are to be updated.

In this manner, diversity of the synthesized images can be further improved according to implementations of the subject matter described herein. Therefore, the generated face images present larger changes in poses and facial expressions, thus being more vivid.

Application of Learning Network

When the training of the learning network 300 for face synthesis is completed, the sub-learning network 360 in the learning network 300 may be provided to the model application subsystem 220 shown in FIG. 2 for face synthesis.

In particular, the model application subsystem 220 may use the first sub-network 310 in the sub-learning network 360 to extract a first feature from a first image 171 about a face of a first user, the first feature characterizing a first identity of the first user. The model application subsystem 220 may use the second sub-network 320 in the sub-learning network 360 to extract a second feature from a second image about a face of a second user, the second feature characterizing a plurality of attributes of the second image other than a second identity of the second user. Then, the model application subsystem 220 may generate a third image 180 about a face of the first user based on the first feature and the second feature using the third sub-network 330 in the sub-learning network 360. The third image 180 may reflect the first identity of the first user and the plurality of attributes of the second image other than the second identity of the second user.

Based on the above depiction, it can be seen that the face synthesis scheme in accordance with implementations of the subject matter described herein enables identity-preserving image synthesis for a face image of any identity regardless of whether the face image of a person having the identity is present in the training data set or not. Besides, while training a model for face synthesis as described above, the solution does not require labeling any other attributes than the identity of a person. In addition, this scheme can further improve the diversity of synthesized images by using unlabeled additional training images for model training, such that the generated face images present larger changes in poses and expressions, thus being more vivid.

Example Processes

Figure 4:
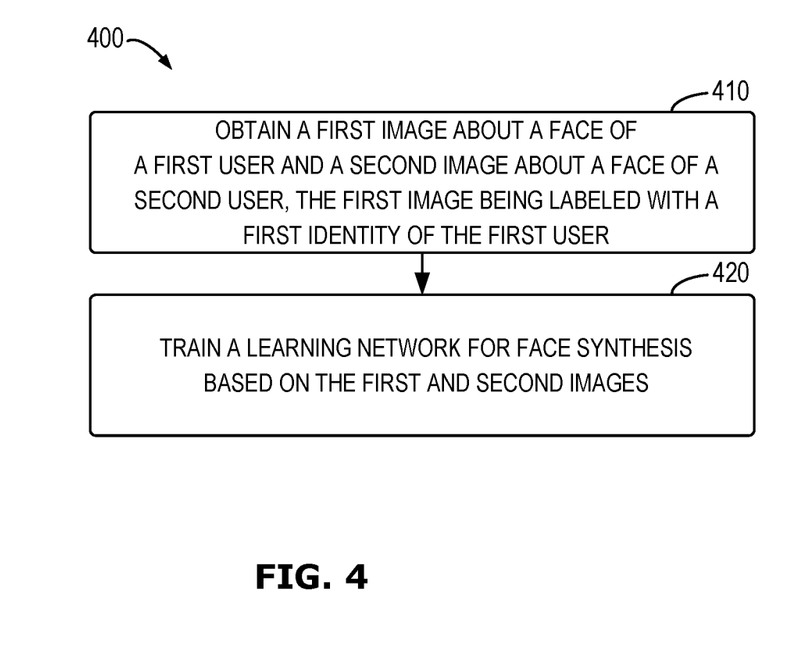
FIG. 4 illustrates a flowchart of a process for training a learning network in accordance with some implementations of the subject matter described herein.

FIG. 4 is a flowchart illustrating a process 400 of training a learning network for face synthesis in accordance with some implementations of the subject matter described herein. The process 400 may be performed by the model training subsystem 210 shown in FIG. 2. It is to be understood that the process 400 my further include additional acts not shown and/or omit some shown acts. The scope of the subject matter described herein is not limited in this regard.

At block 410, the model training subsystem 210 obtains a first image about a face of a first user and a second image about a face of a second user, the first image being labeled with a first identity of the first user.

At 420, the model training subsystem 210 trains a learning network for face synthesis based on the first and second images such that the learning network: extracts a first feature from the first image, the first feature characterizing the first identity of the first user, extracts a second feature from the second image, the second feature characterizing a plurality of attributes of the second image other than a second identity of the second user; and generates a third image about a face of the first user based on the first and second features, the third image reflecting the first identity of the first user and the plurality of attributes of the second image.

In some implementations, the learning network includes a first sub-network, and training the learning network comprises: training the first sub-network such that the first sub-network extracts the first feature from the first image.

In some implementations, the leaning network includes a second sub-network, and training the learning network comprises: training the second sub-network such that the second sub-network extracts the second feature from the second image.

In some implementations, the learning network includes a third sub-network, and outputs of the first and second sub-networks being coupled to an input of the third sub-network. Training the learning network comprises: training the third sub-network such that the third sub-network generates the third image based on the first and second features.

In some implementations, the leaning network includes a fourth sub-network, and an input of the first sub-network and an output of the third sub-network being coupled to an input of the fourth sub-network. Training the learning network comprises: training the fourth sub-network such that the fourth sub-network classifies the first image and the third image as about a same user.

In some implementations, the learning network includes a fifth sub-network, and an output of the third sub-network and an input of the second sub-network being coupled to an input of the fifth sub-network. Training the learning network comprises: training the fifth sub-network such that the fifth sub-network classifies the second image as an original image and the third image as a synthesized image.

Figure 5:
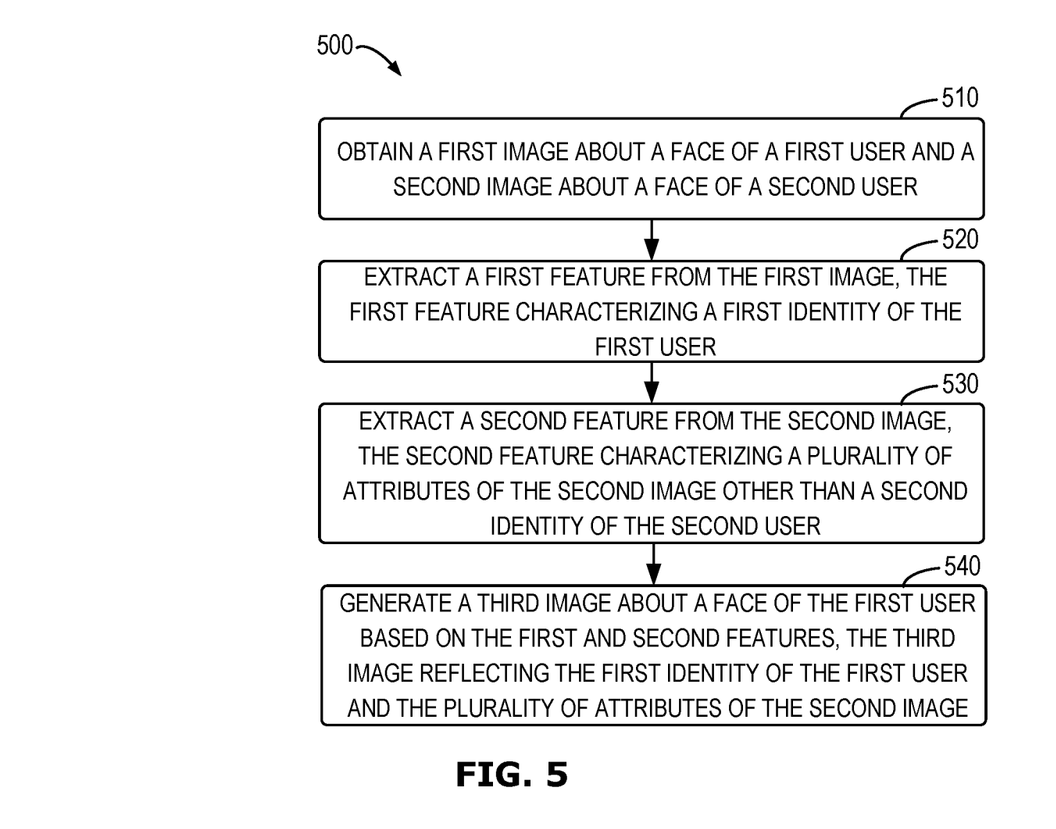
FIG. 5 illustrates a flowchart of a process for face synthesis in accordance with some implementations of the subject matter described herein.

FIG. 5 is a flowchart illustrating a process 500 for face synthesis in accordance with some implementations of the subject matter described herein. The process 500 may be implemented by, for instance, the model application subsystem 220 shown in FIG. 2. It is to be understood that the process 500 may further include additional acts and/or omit some shown acts. The scope of the subject matter described herein is not limited in this regard.

At block 510, the model application subsystem 220 obtains a first image about a face of a first user and a second image about a face of a second user.

At block 520, the model application subsystem 220 extracts a first feature from the first image, the first feature characterizing a first identity of the first user.

At block 530, the model application subsystem 220 extracts a second feature from the second image, the second feature characterizing a plurality of attributes of the second image other than a second identity of the second user.

At block 540, the model application subsystem 220 generates a third image about a face of the first user based on the first and second features, the third image reflecting the first identity of the first user and the plurality of attributes of the second image.

In some implementations, extracting the first feature comprises: extracting the first feature from the first image using a first sub-network in a learning network for face synthesis, the first feature being extracted from at least one layer of the first sub-network.

In some implementations, extracting the second feature comprises: extracting the second feature from the second image using a second sub-network in the learning network, the second feature being extracted from at least one layer of the second sub-network.

In some implementations, generating the third image comprises: generating the third image based on the first and second features using a third sub-network in the learning network, outputs of the first and second sub-networks being coupled to an input of the third sub-network.

Example Implementations

Some example implementations of the subject matter described herein will be listed below.

In a first aspect, the subject matter described herein provides an electronic device, comprising: a processing unit; and a memory coupled to the processing unit and storing instructions for execution by the processing unit. The instructions, when executed by the processing unit, cause the device to perform acts including: obtaining a first image about a face of a first user and a second image about a face of a second user; extracting a first feature from the first image, the first feature characterizing a first identity of the first user; extracting a second feature from the second image, the second feature characterizing a plurality of attributes of the second image other than a second identity of the second user; and generating a third image about a face of the first user based on the first and second features, the third image reflecting the first identity of the first user and the plurality of attributes of the second image.

In some implementations, extracting the first feature comprises: extracting the first feature from the first image using a first sub-network in a learning network for face synthesis, the first feature being extracted from at least one layer of the first sub-network.

In some implementations, extracting the second feature comprises: extracting the second feature from the second image using a second sub-network in the learning network, the second feature being extracted from at least one layer of the second sub-network.

In some implementations, generating the third image comprises: generating the third image based on the first and second features using a third sub-network in the learning network, outputs of the first and second sub-networks being coupled to an input of the third sub-network.

In a second aspect, the subject matter described herein provides an electronic device, comprising: a processing unit and a memory coupled to the processing unit and storing instructions for execution by the processing unit. The instructions, when executed by the processing unit, cause the device to perform acts including: obtaining a first image about a face of a first user and a second image about a face of a second user, the first image being labeled with a first identity of the first user; training a learning network for face synthesis based on the first and second images, such that the learning network: extracts a first feature from the first image, the first feature characterizing the first identity of the first user: extracts a second feature from the second image, the second feature characterizing a plurality of attributes of the second image other than a second identity of the second user; and generates a third image about a face of the first user based on the first and second features, the third image reflecting the first identity of the first user and the plurality of attributes of the second image.

In some implementations, the learning network includes a first sub-network, and training the learning network comprises: training the first sub-network such that the first sub-network extracts the first feature from the first image.

In some implementations, the learning network includes a second sub-network, and training the learning network comprises: training the second sub-network such that the second sub-network extracts the second feature from the second image.

In some implementations, the learning network includes a third sub-network, and outputs of the first and second sub-networks being coupled to an input of the third sub-network. Training the learning network comprises: training the third sub-network such that the third sub-network generates the third image based on the first and second features.

In some implementations, the learning network includes a fourth sub-network, and an input of the first sub-network and an output of the third sub-network being coupled to an input of the fourth sub-network. Training the learning network comprises: training the fourth sub-network such that the fourth sub-network classifies the first image and the third image as about a same user.

In some implementations, the learning network includes a fifth sub-network, and an output of the third sub-network and an input of the second sub-network being coupled to an input of the fifth sub-network. Training the learning network comprises: training the fifth sub-network such that the fifth sub-network classifies the second image as an original image and the third image as a synthesized image.

In a third aspect, the subject matter described herein provides a computer-implemented method, including: obtaining a first image about a face of a first user and a second image about a face of a second user; extracting a first feature from the first image, the first feature characterizing a first identity of the first user; extracting a second feature from the second image, the second feature characterizing a plurality of attributes of the second image other than a second identity of the second user: and generating a third image about a face of the first user based on the first and second features, the third image reflecting the first identity of the first user and the plurality of attributes of the second image.

In some implementations, extracting the first feature comprises: extracting the first feature from the first image using a first sub-network in a learning network for face synthesis, the first feature being extracted from at least one layer of the first sub-network.

In some implementations, extracting the second feature comprises: extracting the second feature from the second image using a second sub-network in the learning network, the second feature being extracted from at least one layer of the second sub-network.

In some implementations, generating the third image comprises: generating the third image based on the first and second features using a third sub-network in the learning network, outputs of the first and second sub-networks being coupled to an input of the third sub-network.

In a fourth aspect, the subject matter described herein provides a computer-implemented method, including: obtaining a first image about a face of a first user and a second image about a face of a second user, the first image being labeled with a first identity of the first user; and training a learning network for face synthesis based on the first and second images, such that the learning network: extracts a first feature from the first image, the first feature characterizing the first identity of the first user; extracts a second feature from the second image, the second feature characterizing a plurality of attributes of the second image other than a second identity of the second user; and generates a third image about a face of the first user based on the first and second features, the third image reflecting the first identity of the first user and the plurality of attributes of the second image.

In some implementations, the learning network includes a first sub-network, and training the learning network comprises training the first sub-network such that the first sub-network extracts the first feature from the first image.

In some implementations, the learning network includes a second sub-network, and training the learning network comprises: training the second sub-network such that the second sub-network extracts the second feature from the second image.

In some implementations, the learning network includes a third sub-network, and outputs of the first and second sub-networks being coupled to an input of the third sub-network. Training the learning network comprises: training the third sub-network such that the third sub-network generates the third image based on the first and second features.

In some implementations, the learning network includes a fourth sub-network, and an input of the first sub-network and an output of the third sub-network being coupled to an input of the fourth sub-network. Training the learning network comprises: training the fourth sub-network such that the fourth sub-network classifies the first image and the third image as about a same user.

In some implementations, the learning network includes a fifth sub-network, and an output of the third sub-network and an input of the second sub-network being coupled to an input of the fifth sub-network. Training the learning network comprises: training the fifth sub-network such that the fifth sub-network classifies the second image as an original image and the third image as a synthesized image.

In a fifth aspect, the subject matter described herein provides a computer program product tangibly stored in a non-transient computer storage medium and including computer executable instructions, the computer executable instructions, when executed by a device, causing the device to implement the method in the third aspect of the subject matter described herein.

In a sixth aspect, the subject matter described herein provides a computer program product tangibly stored in a non-transient computer storage medium and including computer executable instructions, the computer executable instructions, when executed by a device, causing the device to implement the method in the fourth aspect of the subject matter described herein.

In a seventh aspect, the subject matter described herein provides a computer readable medium having computer executable instructions stored thereon, the computer executable instructions, when executed by a device, causing the device to implement the method in the third aspect of the subject matter described herein.

In an eighth aspect, the subject matter described herein provides a computer readable medium having computer executable instructions stored thereon, the computer executable instructions, when executed by a device, causing the device to implement the method in the fourth aspect of the subject matter described herein.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs). System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:
1. An electronic device, comprising:
a processing unit;
a memory coupled to the processing unit and storing instructions for execution by the processing unit, the instructions, when executed by the processing unit, causing the device to perform operations comprising:
obtaining a first image about a face of a first user and a second image about a face of a second user;
extracting a first feature from the first image, the first feature characterizing a first identity of the first user;

extracting a second feature from the second image, the second feature characterizing a plurality of attributes of the second image other than a second identity of the second user; and generating, a third image about a face of the first user based on the first and the second features using a learning network previously trained by minimizing a first reconstruction loss between the second image and the third image and preserving one or more of the plurality of attributes of the second image while minimizing a second reconstruction loss between the first image and the third image, the third image reflecting the first identity of the first user and the plurality of attributes of the second image.

2. The device according to claim 1, wherein extracting the first feature comprises:

extracting the first feature from the first image using a first sub-network in the learning network for face synthesis, the first feature being extracted from at least one layer of the first sub-network.

3. The device according to claim 2, wherein extracting the second feature comprises:

extracting the second feature from the second image using a second sub-network in the learning network, the second feature being extracted from at least one layer of the second sub-network.

4. The device according to claim 3, wherein generating the third image comprises:

generating the third image based on the first and second features using a third sub-network in the learning network, outputs of the first and second sub-networks being coupled to an input of the third sub-network.

5. An electronic device, comprising:
a processing unit;
a memory coupled to the processing unit and storing instructions for execution by the processing unit, the instructions, when executed by the processing unit, causing the device to perform operations comprising:
obtaining a first image about a face of a first user and a second image about a face of a second user, the first image being labeled with a first identity of the first user; and
training a learning network for face synthesis based on the first and second images, such that the learning network:
extracts a first feature from the first image, the first feature characterizing the first identity of the first user;
extracts a second feature from the second image, the second feature characterizing a plurality of attributes of the second image other than a second identity of the second user; and
generates a third image about a face of the first user based on the first and second features using the learning network previously trained by minimizing a first reconstruction loss between the second image and the third image and preserving one or more of the plurality of attributes of the second image while minimizing a second reconstruction loss between the first image and the third image, the third image reflecting the first identity of the first user and the plurality of attributes of the second image.

6. The device according to claim 5, wherein the learning network includes a first sub-network, and training the learning network comprises:

training the first sub-network such that the first sub-network extracts the first feature from the first image.

7. The device according to claim 6, wherein the learning network includes a second sub-network, and training the learning network comprises:

training the second sub-network such that the second sub-network extracts the second feature from the second image.

8. The device according to claim 7, wherein the learning network includes a third sub-network, outputs of the first and the second sub-networks being coupled to an input of the third sub-network, and training the learning network comprises:

training the third sub-network such that the third sub-network generates the third image based on the first and second features.

9. The device according to claim 8, wherein the learning network includes a fourth sub-network, an input of the first sub-network and an output of the third sub-network being coupled to an input of the fourth sub-network, and training the learning network comprises:

training the fourth sub-network such that the fourth sub-network classifies the first image and the third image as about a same user.

10. The device according to claim 9, wherein the learning network includes a fifth sub-network, an output of the third sub-network and an input of the second sub-network being coupled to an input of the fifth sub-network, and training the learning network comprises:

training the fifth sub-network such that the fifth sub-network classifies the second image as an original image and the third image as a synthesized image.

11. A computer-implemented method, comprising:
obtaining a first image about a face of a first user and a second image about a face of a second user;
extracting a first feature from the first image, the first feature characterizing a first identity of the first user;
extracting a second feature from the second image, the second feature characterizing a plurality of attributes of the second image other than a second identity of the second user; and
generating a third image about a face of the first user based on the first and second features using a learning network previously trained by minimizing a first reconstruction loss between the second image and the third image and preserving one or more of the plurality of attributes of the second image while minimizing a second reconstruction loss between the first image and the third image, the third image reflecting the first identity of the first user and the plurality of attributes of the second image.

12. The method according to claim 11, wherein extracting the first feature comprises:

extracting the first feature from the first image using a first sub-network in the learning network for face synthesis, the first feature being extracted from at least one layer of the first sub-network.

13. The method according to claim 12, wherein extracting the second feature comprises:

extracting the second feature from the second image using a second sub-network in the learning network, the second feature being extracted from at least one layer of the second sub-network.

14. The method according to claim 13, wherein generating the third image comprises:

generating the third image based on the first and second features using a third sub-network in the learning network, outputs of the first and second sub-networks being coupled to an input of the third sub-network.

* * * * *